F. McTARNAHAN.
Gang Plow.
No. 84,748.
Patented Dec. 8, 1868.
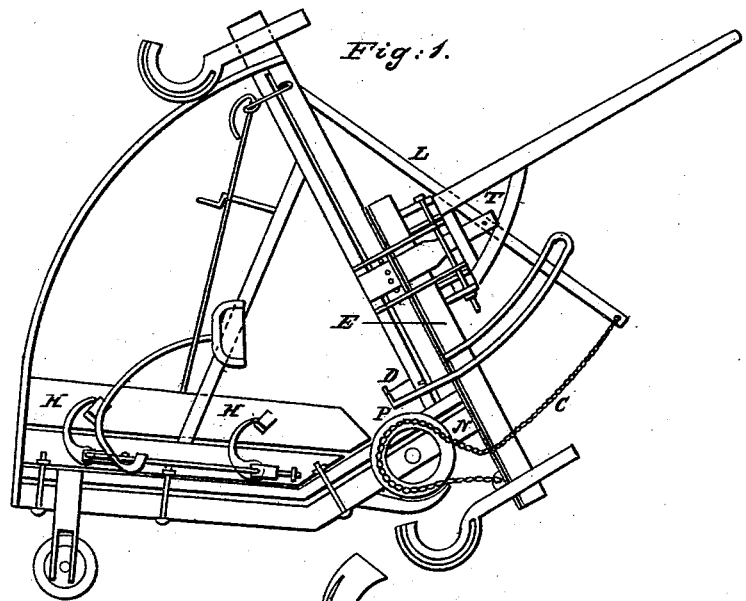
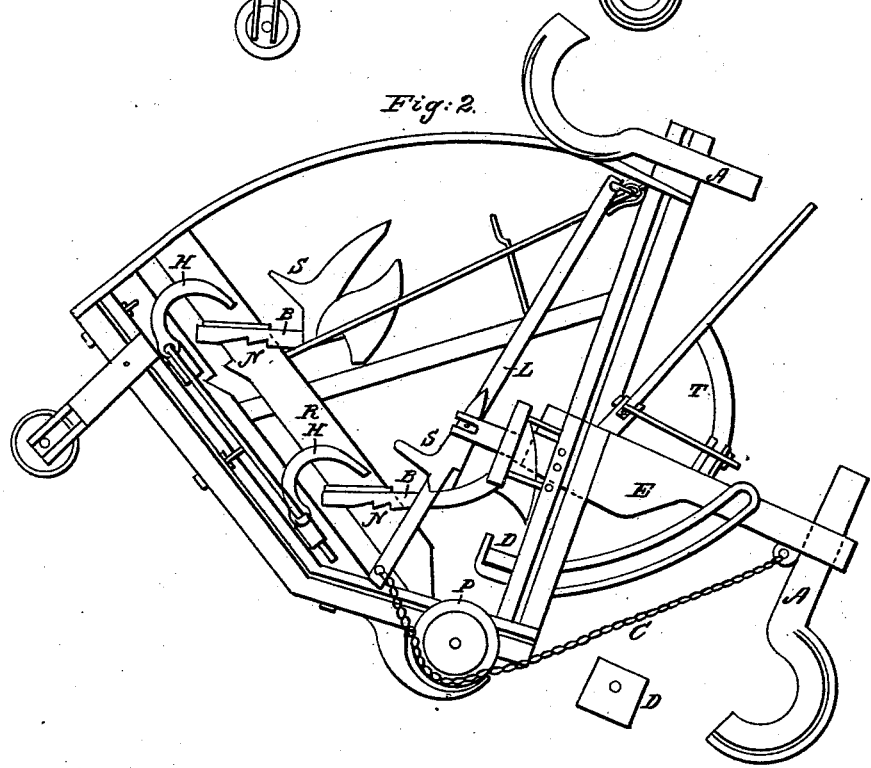

United States Patent Office.

FRANCIS McTARNAHAN, OF SANTA CLARA, CALIFORNIA.

IMPROVEMENT IN GANG-PLOWS.

Specification forming part of Letters Patent No. 84,748, dated December 8, 1868.

*To all whom it may concern:*

Be it known that I, FRANCIS McTARNAHAN, of Santa Clara, in the county of Santa Clara, in the State of California, have invented a new and Improved Gang-Plow; and I do hereby declare that the following is a full and exact description thereof, reference being had to the accompanying drawings, and to the letters of reference marked thereon.

The nature of my invention consists in the horses working the gang-plow in nearly every particular.

To enable others to make and use my invention, I will proceed to describe its construction and operation.

Figure 1 represents the gang-plow when moving straight forward. Fig. 2 is a view when turning, the plows being elevated above the ground.

The letter R is the beam in which the plows are fastened. B is the bar of the plow, which goes through the beam; N, the notches in the bar and beam, being locked together by a key in front of the upright bar; S, the colter and stubble-catcher; H, the semicircular hinges by which plows are raised out of the ground; L, the beam to which the lever is attached at one end and a chain to the other; P, the pulley on which the chain works; C, the chain; A, the circular slide; E, the evener, to which the chain, slide, and tongue are attached; T, the tongue, to which the horses are attached; D, the block under the axle-tree, to which the evener is attached, being at the right end of the axle-tree.

The object of the beam, in which the plows are fastened, being hung on hinges is to raise the plows out of the ground when desired.

The object of the hinges being in a semicircular form is to give the plows as much elevation as possible.

The object of the notches in the upright bars to which the plows are attached, and a key on the opposite side, is to hold the plows firm, and is stronger and more easily managed than any in use.

The stubble-catcher is a piece connected with the colter and fastened to the bar between the plows and beam, and is for the purpose of collecting the stubble and prevents it choking the plows. All plows previously invented have been much troubled by this obstacle. The semicircular slides in the axle-tree, and evener at the end, with screws, are for the purpose of regulating the depth of furrows, which may be done by the plowman in a moment, to suit his wish.

As the machinery designated by the letters C, E, L, and P is all constructed for the purpose of raising and letting down the plows by the team drawing the plows, I will describe them. This part of the gang-plow is so constructed that the beam is attached to the lever of the plow-beam at one end and works on a pivot in an upright post placed on the axle-tree near the center, and at the other end attached to a chain passing over a pulley fastened to the end of the evener to which the tongue is attached. A king-bolt is passed through the evener, near the other end, so that when the team turns this machinery raises the plows sufficiently to clear the ground. When the team straightens, the plow lowers to position, and the team moves forward and executes the plowing without the plowman performing any labor except driving the team. This part of the machinery works easy, and is at all times ready to perform its office. The pulley turns easy, and has a guard to keep the chain in its place, without regard to being tight or loose. The guard extending forward, fastened to the front side of the axle-tree above and passing back under the axle-tree, is intended, first, as a guard in which the evener slides and is kept in place; second, it tends to keep a block in place, which is designated by the letter D. Said block, by drawing a pin or bolt and changing sides, will regulate the amount of land, more or less, as the case may require.

D, No. 1, shows the thickness of the block, and the form as it is placed on the guard. No. 2 shows the sides of the block.

I claim—

1. The frame or groundwork of the gang-plow.

2. The combination and arrangement of the beam R, to which the plows are fastened, the beam to which said plow-beam is fastened by hinges, the semicircular hinges, as constructed, and the manner of fastening the plows in the beam, all as shown.

3. The screw-slides A, in combination with the frame.

4. The combination and arrangement of the beam L, to which the lever is fastened, the post on which it works, the chain, the pulley on which it works, the evener, and the guard, all as described.

5. The square block D under the axle-tree, for regulating the amount of land, in combination with the evener.

6. The construction, combination, and arrangement of the several parts, as shown and described.

FRANCIS McTARNAHAN.

Witnesses:
WM. M. LOVELL,
JOHN M. SULLIVAN.